United States Patent
Arellano et al.

(10) Patent No.: US 7,496,630 B2
(45) Date of Patent: Feb. 24, 2009

(54) ADAPTIVE NOTIFICATION DELIVERY IN A MULTI-DEVICE ENVIRONMENT

(75) Inventors: Javier B. Arellano, Austin, TX (US); Sreenivasa Gorti, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 830 days.

(21) Appl. No.: 10/430,806

(22) Filed: May 6, 2003

(65) Prior Publication Data
US 2004/0223485 A1    Nov. 11, 2004

(51) Int. Cl.
G06F 15/16    (2006.01)
(52) U.S. Cl. .................. 709/206; 709/217; 709/239
(58) Field of Classification Search .......... 709/206, 709/217, 239
See application file for complete search history.

(56) References Cited

U.S. PATENT DOCUMENTS

| | | | | |
|---|---|---|---|---|
| 6,654,790 | B2 * | 11/2003 | Ogle et al. ........... | 709/206 |
| 6,701,378 | B1 | 3/2004 | Gilhuly et al. | |
| 6,779,019 | B1 | 8/2004 | Mousseau et al. | |
| 6,865,599 | B2 * | 3/2005 | Zhang ................ | 709/218 |
| 2004/0125123 | A1 * | 7/2004 | Vasudevan ........... | 345/716 |
| 2004/0158611 | A1 * | 8/2004 | Daniell et al. ....... | 709/206 |

FOREIGN PATENT DOCUMENTS

| | | |
|---|---|---|
| WO | WO 98/02005 | 1/1998 |
| WO | WO 2004/066527 A2 | 8/2004 |

* cited by examiner

*Primary Examiner*—John Follansbee
*Assistant Examiner*—Nghi V Tran
(74) *Attorney, Agent, or Firm*—Toler Law Group

(57) ABSTRACT

Multiple network-enabled devices each having a respective agent module are associated with a user. Each agent module is to determine if its associated network-enabled device is capable of rendering content associated with a notification message received thereby, to advertise its services and capabilities to at least one other respective agent module, to discover at least one other respective agent module, and to communicate information with at least one other respective agent module. A notification service node is to receive notification messages from at least one Instant Messaging network and to forward each of the notification messages to a current device of the network-enabled devices. For each notification message, the respective agent module for the current device directs the current device to render content associated therewith if capable of same, and if incapable, negotiates with another one of the network-enabled devices to render the content.

14 Claims, 2 Drawing Sheets

ADAPTIVE NOTIFICATION DELIVERY IN A MULTI-DEVICE ENVIRONMENT

BACKGROUND

1. Field of the Invention

The present invention relates to methods and systems for delivering notification messages from messaging networks.

2. Description of the Related Art

Home network environments are becoming increasingly prevalent as network-enabled consumer devices proliferate. Examples of the network-enabled consumer devices include personal computers (PCs), personal digital assistants (PDAs), smart telephones, Web tablets or other tablet computers, set-top boxes, and Internet-enabled refrigerators. Each of these devices, at its core, has Internet or Web access in addition to one or more device-specific functions.

A popular application of the Internet is instant messaging (IM). Users receive and send messages to each other using a client application interface. For most popular IM networks (e.g. America Online's AOL Instant Messenger and Microsoft's MSN Instant Messenger), versions of the client software exist for PCs, PDAs, and sometimes for smart telephones.

Instant messaging is currently evolving from basic user-to-user notification to more generalized notification services where back-end services send alert messages to users. For example, an airline may send notification to a user about an arrival or departure status of a particular flight. Another example is a home surveillance camera sending an alert and a Web link to a video clip. A further example is an alert from a Web-based auction site about a competing bid to which a user needs to respond within an hour.

Current client-based IM networks offer limited support for the aforementioned scenarios. First, each of these IM networks requires a proprietary client. Second, the client needs to be available on multiple devices within the user's home. Third, dealing with multiple of these IM networks is a nuisance for an average user. In some cases, the client itself is a gateway to multiple IM networks, but these gateway clients have been limited to a few kinds of devices. Fourth, the user needs to be "logged in" to the network on a particular device and have this device be available to receive the notification. Often, this particular device is a cellular phone which has limited display and processing abilities.

BRIEF DESCRIPTION OF THE DRAWINGS

The present invention is pointed out with particularity in the appended claims. However, other features are described in the following detailed description in conjunction with the accompanying drawing in which:

DETAIL DESCRIPTION OF THE PREFERRED EMBODIMENT(S)

Disclosed herein are methods and systems that enable a user to receive notifications from multiple IM networks on a variety of consumer devices. The method and system coordinate multiple consumer devices of the user based on the devices' capabilities to properly render different types of messages (including different media formats, different connection types, and different types of transactions). A notification service node forwards notification messages to an active one of the user's devices. The active device proceeds to display content associated with the notification message if capable of same. If incapable, the active device negotiates with a secondary device to render the content.

Figure 1:
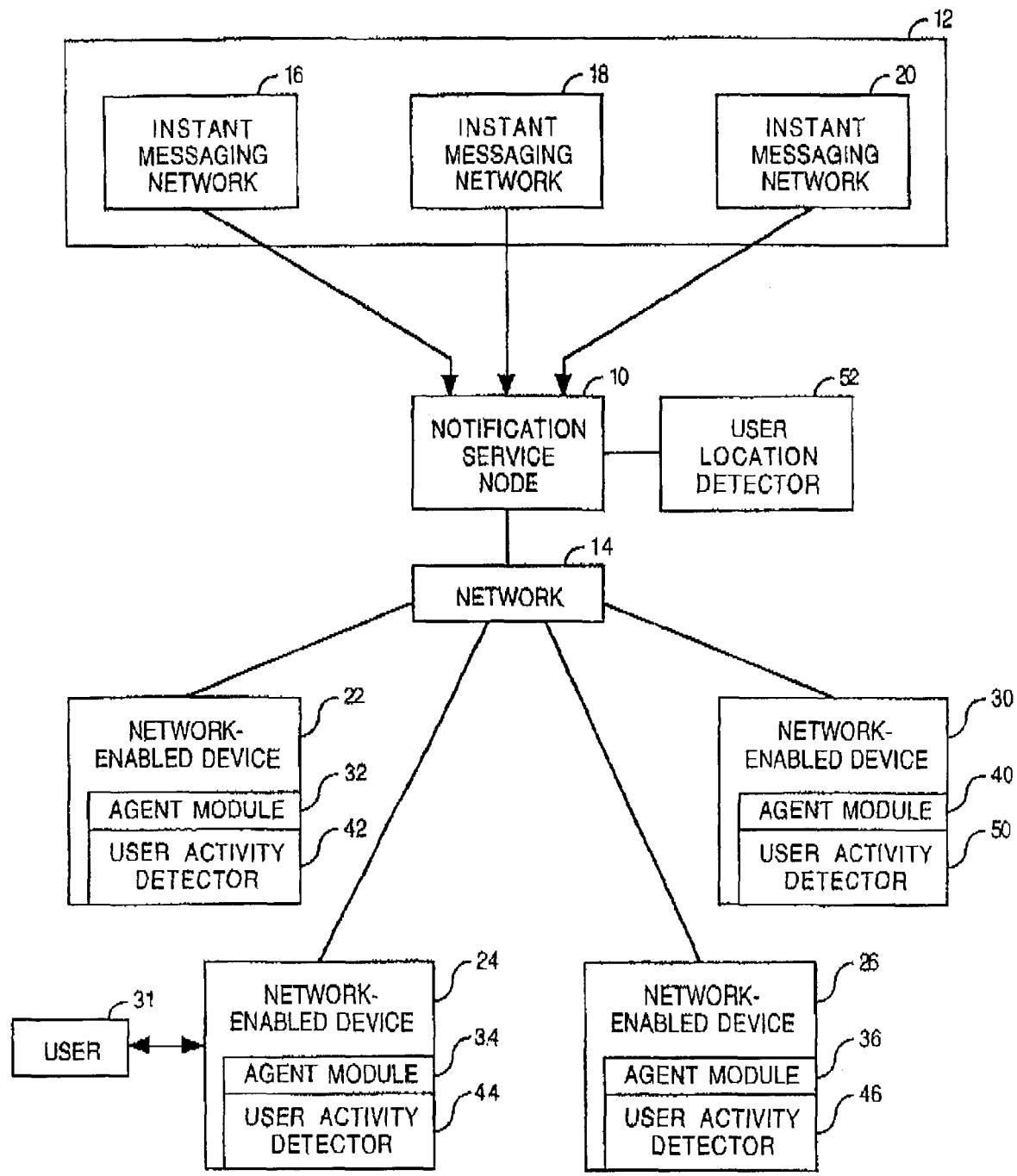
FIG. 1 is a block diagram of an embodiment of a system for adaptive notification delivery.

FIG. 1 is a block diagram of an embodiment of a system for adaptive notification delivery. The system comprises a notification service node 10 registered to receive notification messages on at least one Instant Messaging (IM) network 12, and to forward each notification message to an end device within a network 14. Preferably, the notification service node 10 is to receive notification messages from multiple IM networks (e.g. AOL IM from America Online and GROOVE). The multiple IM networks may include one or more business-oriented IM networks and one or more consumer-oriented IM networks. For purposes of illustration and example, the notification service node 10 is shown to receive notification messages from three different IM networks 16, 18 and 20.

The notification service node 10 comprises a processor programmed to perform the specific acts described herein. The processor may be responsive to a computer-readable medium encoded with executable instructions representing a computer program. Examples of the computer-readable medium include, but are not limited to, a magnetic medium such as a hard drive or another magnetic disk, an optical medium such as a CD, a DVD, or another optical disk, and an electronic medium such as an electronic memory or an electronic memory card. The notification service node 10 may be integrated with one of the user's network-enabled devices, or may be a standalone gateway device.

In one implementation, the notification service node 10 provides a gateway service. In other implementations, the notification service node 10 incorporates filters to process the notification messages based on message urgency, message sender information, a user profile, at least one user preference, and past behavior of a user.

The notification service node 10 may serve a single user, in which case each notification message is forwarded to one or more network-enabled devices associated with the single user. Alternatively, the notification service node 10 may serve multiple users, in which case each notification message is forwarded to one or more network-enabled devices associated with its intended recipient user.

Regardless of whether a single user or multiple users are served, the notification service node 10 forwards each notification message to a current device associated with the user who is the intended recipient. Preferably, the current device is one of the user's network-enabled devices that is either closest in proximity to the user or has most recently experienced user activity.

For purposes of illustration and example, four network-enabled devices 22, 24, 26 and 30 associated with a particular user 31 are depicted in FIG. 1. The network-enabled device 22 may comprise a set-top box in the particular user's home, for example. The network-enabled device 24 may comprise a personal computer in the particular user's bedroom, for example. The network-enabled device 26 may comprise a Web tablet computer for the particular user 31, for example. The network-enabled device 30 may comprise the particular user's cellular telephone, for example.

In general, each of the network-enabled devices 22, 24, 26 and 30 is capable of receiving notification messages via the network 14 from the notification service node 10. However, each of the network-enabled devices 22, 24, 26 and 30 has its own set of capabilities and services for rendering content and performing actions associated with a notification message. For example, a protocol enabling secure communications between a Web server and a browser, such as Secure Sockets Layer (SSL), may be fully supported by the network-enabled devices 24 and 26 (e.g. the personal computer and the Web tablet), but may have limited support by the network-enabled device 22 (e.g. the set-top box). As another example, the network-enabled device 22 (e.g. the set-top box) may support higher quality video than the network-enabled devices 24 and 26 (e.g. the personal computer and the Web tablet).

Each of the network-enabled devices 22, 24, 26 and 30 has a respective agent module 32, 34, 36 and 40 to assist in providing adaptive notification delivery based on device capabilities and user activity and/or proximity. Each respective agent module is a lightweight software module which acts to determine if its associated network-enabled device is capable of rendering content associated with a notification message received thereby, to advertise its services and capabilities to at least one other respective agent module, to discover at least one other agent module, and to communicate information with at least one other respective agent module. Agent-to-agent communication can be facilitated using either an Agent Communication Language or a peer-to-peer protocol such as JXTA (Juxtapose) via the network 14. The network 14 may comprise a wireless network (e.g. 802.11), a wireline network (e.g. Ethernet), or a combination thereof. In one embodiment, the network 14 comprises a local area network (LAN) for a user's home. In another embodiment, the network 14 comprises a wide area network (WAN) such as a digital subscriber line (DSL) network that serves multiple users premises.

As stated in the foregoing description, the notification service node 10 forwards a notification message to a current device based on user proximity or user activity. The respective agent module of the current device processes the notification message based on the capabilities of the current device. In particular, the respective agent module directs the current device to render content associated with the notification message if the current device is capable of same. If the current device is incapable, the respective agent module negotiates with another one of the network-enabled devices to render the content.

To determine the current device for the particular user 31, each of the network-enabled devices 22, 24, 26 and 30 may have a respective user activity detector 42, 44, 46 and 50. Each user activity detector may detect user activity similar to a screen saver program by detecting user-initiated input actions made by a keyboard, a pointing device such as a mouse or a touch pad, or another user-input device associated with its network-enabled device. The user activity detectors 42, 44, 46 and 50 detect which of the network-enabled devices 22, 24, 26 and 30 is experiencing or has most recently experienced user activity. The current device may be assigned as the presently-active one or the most-recently active one of the network-enabled devices 22, 24, 26 and 30.

Alternatively, a user location detector 52 may be used to assign one of the network-enabled devices 22, 24, 26 and 30 as the current device. The user location detector 52 may comprise an agent monitoring a network of sensors to determine a user location, and determine which of the network-enabled devices 22, 24, 26 and 30 is closest in proximity to the particular user 31. The current device may be assigned as the closest one of the network-enabled devices 22, 24, 26 and 30.

Figure 2:
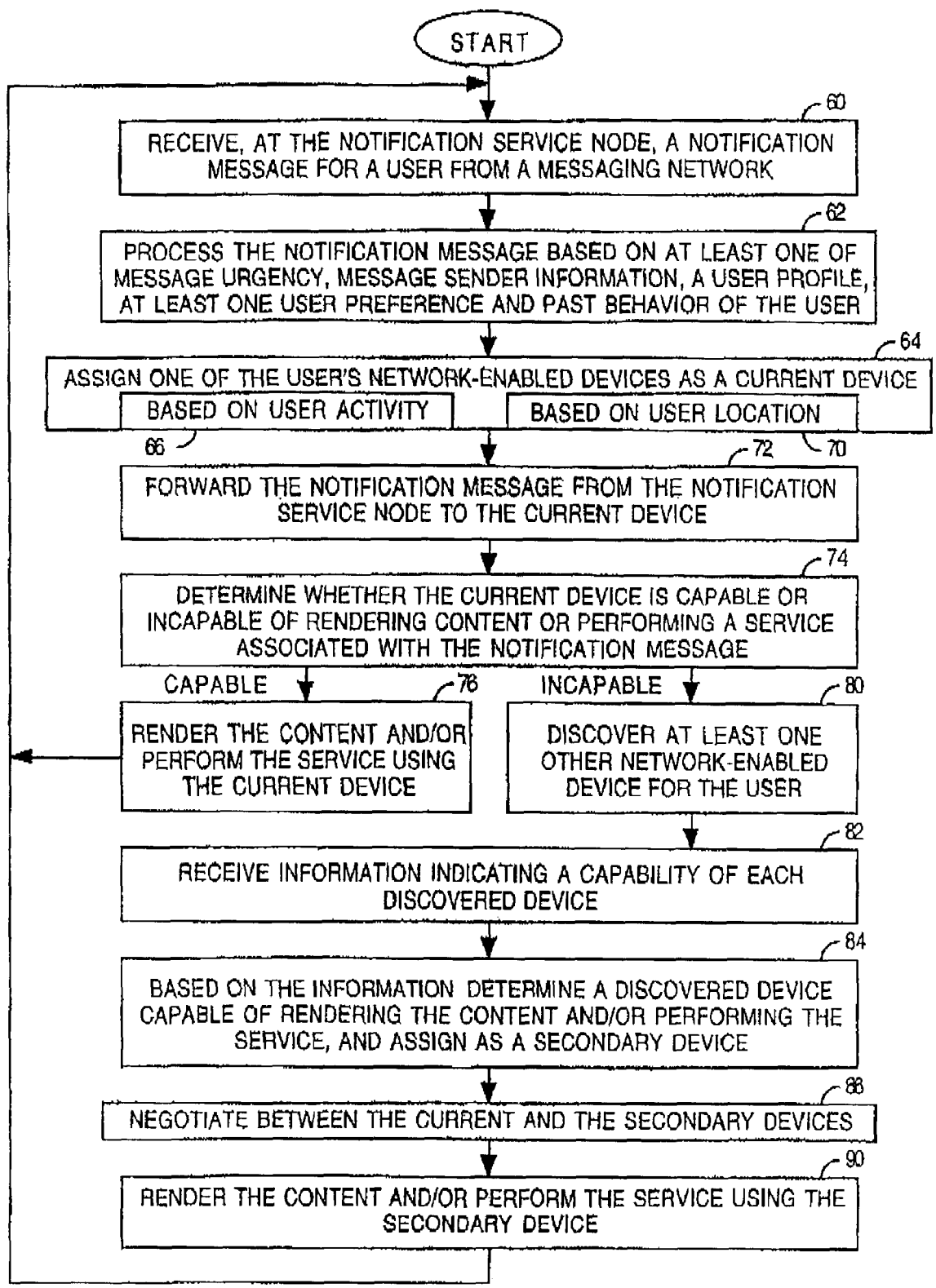
FIG. 2 is a flow chart of an embodiment of a method of adaptive notification delivery.

An embodiment of a method of adaptive notification delivery using the system of FIG. 1 is described with reference to the flow chart in FIG. 2. As indicated by block 60, the method comprises receiving, at the notification service node 10, a notification message for the user 31 from an IM network. The IM network may comprise any of the IM networks 16, 18 and 20.

Optionally, as indicated by block 62, the method comprises processing the notification message based on at least one of message urgency, message sender information, a user profile, at least one user preference and past behavior of the user 31. The act of processing is performed by the notification service node 10.

As indicated by block 64, the method comprises assigning one of the user's network-enabled devices 22, 24, 26 and 30 as a current device. This act may comprise detecting which of the user's network-enabled devices 22, 24, 26 and 30 is experiencing or has most recently experienced user activity, and assigning same as the current device (block 66). Alternatively, this act may comprise detecting a location of the user 31 and assigning the current device as one of the user's network-enabled devices 22, 24, 26 and 30 close in proximity to the user 31 (block 70). In addition to user location and user activity, the current device may be assigned based on the processing performed in block 62. For purposes of illustration and example, consider that the user 31 is using and/or proximate to the network-enabled device 24 when the notification message is received, and therefore the network-enabled device 24 is the current device.

As indicated by block 72, the method comprises forwarding the notification message from the notification service node 10 to the current device. Continuing with the above example, the notification message is forwarded to the network-enabled device 24.

As indicated by block 74, the method comprises determining whether the current device is capable or incapable of rendering content or performing a service associated with the notification message. This act may be performed by the agent module 34 of the current device. If it is determined that the current device is capable of rendering the content and/or performing the service, the content is rendered and/or the service is performed using the current device (block 76). Rendering content may comprise visually and/or audibly displaying the content. If it is determined that the current device is incapable of rendering the content and/or performing the service, the following acts are performed to find another network-enabled device to render the content and/or perform the service.

As indicated by block 80, the method comprises discovering, by the current device, at least one other network-enabled device associated with the user 31. The current device discovers the at least one other network-enabled device by agent-to-agent communication between agent modules via the network 14. In one embodiment, the current device discovers all of the other network-enabled devices 22, 26 and 30 associated with the user 31.

As indicated by block 82, the method comprises receiving, by the current device and from at least one discovered device, information indicating a capability of the discovered device. The information is communicated between agent modules via the network 14.

As indicated by block 84, the method comprises determining which of the discovered device(s) is capable of rendering the content and/or performing the service based on the information. A capable device that is near the current device is selected to be a secondary device to render the content and/or perform the service. Continuing with the above example, consider that the network-enabled device 22 is the secondary device.

As indicated by blocks 86 and 90, the method comprises negotiating, between the current device and the secondary device, to cause the secondary device to render the content and/or perform the service. Negotiation is performed by agent-to-agent communication via the network 14. Continuing with the above example, the content associated with the notification message is communicated to and rendered by the network-enabled device 22. The network-enabled device 22 also may be used to perform a service associated with the notification message.

Two specific examples are provided to illustrate practical applications of the adaptive notification method and system.

EXAMPLE 1

Secure Protocol Service

John is scheduled to take the 8:00 AM flight from Austin to Chicago, then on to Boston, using a particular airline. However, due to bad weather in Chicago, the flight to Chicago is canceled. As John is watching the morning news at home and preparing to leave for the airport, an alert is received by a set-top box through the notification service, and displayed on his bedroom TV. In the alert, the airline suggests an alternative route and needs confirmation of his acceptance to immediately reroute his travel plans. Using the set-top box, John selects to see the alternative route on his bedroom TV. However, since the set-top box is limited in its SSL support, the set-top box negotiates with a personal computer in the bedroom to display a secure Web page to allow John to complete the transaction.

EXAMPLE 2

Content Rendering

Bob is surfing the Web on his Web tablet computer when he receives a notification from one of his friends. The notification message suggests that Bob should visit a local air show today. His friend has attached a Uniform Resource Locator (URL) or another computer address link to a video clip which is an advertisement for the show. Bob clicks "play" on the associated notification. The Web tablet determines that it lacks the resources to properly play the video clip, and thus decides to negotiate with a set-top box to play the video clip using a television display.

Both of the above examples show how an active device receives a notification and then negotiates with a nearby device to properly complete a service. Delivering the notification to the active device obviates the need for users to repeatedly check for time-critical notifications. Negotiating with a nearby device acts to aggregate capabilities across multiple devices. In each case, the only service that is aware of the back-end IM or other messaging network is the notification gateway service.

It will be apparent to those skilled in the art that the disclosed subject matter may be modified in numerous ways and may assume many embodiments other than the preferred forms specifically set out and described herein. For example, the acts of discovering other devices and their capabilities may be performed prior to determining whether the current device is capable of rendering the content and/or performing the service. More generally, some acts depicted in FIG. 2 may be performed in an alternative order or in parallel to provide the same adaptive notification result.

Accordingly, it is intended by the appended claims to cover all modifications which fall within the true spirit and scope of the present invention.

What is claimed is:

1. A method of delivering notification message, the method comprising:

receiving a notification message at a first network-enable device of a plurality of network-enabled devices;

determining, at the first network-enabled device, that the first network-enabled device is incapable of rendering content of the notification message;

discovering via the first network-enabled device a second network-enabled device by agent-to-agent communication between an agent module of the first network-enable device and an agent module of the second network-enable device, wherein both the agent module of the first network-enable device and the agent module of the second network-enable device are capable of discovering other agent modules of the plurality of network-enable devices;

receiving information at the first network-enabled device from at least the second network-enabled device of the plurality of network-enabled devices, the information indicating the capability of the second network-enabled device to render the content of the notification message; and determining, at the first network-enabled device, that the second network-enabled device is capable of rendering the content of the notification message based on the information received from the second network-enabled device, the first network-enabled device negotiating with the second network-enabled device for the second network-enabled device to render the content of the notification message;

receiving information at the first network-enabled device from a third network-enabled device of the plurality of network-enabled devices, wherein the information indicates the capability of the third network-enabled device to render the content of the notification message; and determining, at the first network-enabled device, that the third network-enabled device is capable of rendering the content of the notification message based on the information received from the third network-enabled device;

wherein the first network-enabled device chooses to negotiate with the second network-enabled device to render the content of the notification message based on a location of the second network-enabled device and a location of the third network-enabled device with respect to a location of the first network-enabled device.

2. The method, as recited in claim 1, further comprising the first network-enabled device negotiating with the second network-enabled device for the second network-enabled device to perform a service associated with the notification message.

3. The method, as recited in claim 1, wherein the plurality of network-enabled devices includes a set-top box device, a personal computer, a web tablet computer, a cellular telephone, or any combination thereof.

4. The method, as recited in claim 1, wherein rendering the content of the notification message includes visually presenting the content, audibly presenting the content, or any combination thereof.

5. The method, as recited in claim 1, wherein the notification message includes a particular format, a particular connection type, a particular type of transaction, or any combination thereof.

6. A network-enable device to deliver notification message, the network-enabled device comprising:

a processor and a memory accessible to the processor, the memory including an agent module executable by the processor to:

receiving a notification message via a notification service node;

determining that the network-enabled device is incapable of rendering content of the notification message;

discovering at least one other network-enabled device from a plurality of network-enabled devices by communication from an agent module of the network-enable device to an agent module of the at least one other network-enable device, wherein the agent module of the network-enable device and the agent module of the at least one other network-enable device are both capable of discovering agent modules of the plurality of network-enable devices;

receiving information from the plurality of the network-enable devices, wherein the information indicates the capability of each respective additional network-enabled device to render the content of the notification message;

identify a particular additional network-enabled device of the plurality of network-enabled devices that is capable of rendering the content of the notification message based on the information received from the plurality of network-enabled devices;

negotiate with the particular additional network-enable device to render the content of the notification message;

receive information at the network-enabled device from a third network-enabled device of the plurality of network-enabled devices, wherein the information indicates the capability of the third network-enabled device to render the content of the notification message;

determine, at the network-enabled device, that the third network-enabled device is capable of rendering the content of the notification message based on the information received from the third network-enabled device;

wherein the network-enabled device chooses to negotiate with the at least one other network-enabled device to render the content of the notification message based on a location of the at least one other network-enabled device and a location of the third network-enabled device with respect to a location of the network-enabled device.

7. The network-enabled device, as recited in claim 6, wherein the notification service node is integrated with the network-enabled device.

8. The network-enabled device, as recited in claim 6, wherein the notification message is intended for a user associated with the network-enabled device and the plurality of additional network-enabled devices.

9. The network-enabled device, as recited in claim 8, wherein the memory includes a user activity detector executable by the processor to detect user initiated input actions submitted via an input device associated with the network-enabled device.

10. The network-enabled device, as recited in claim 9, wherein the input device includes a keyboard, a mouse, a touch pad, another user-input device, or any combination thereof.

11. The network-enabled device, as recited in claim 6, wherein the network-enabled device communicates with the plurality of additional network-enabled devices via a wireline network, a wireless network, or any combination thereof.

12. The network-enabled device, as recited in claim 6, wherein the network-enabled device communicates with the plurality of additional network-enabled devices via a local area network (LAN), a wide area network (WAN), or any combination thereof.

13. The network-enabled device, as recited in claim 6, wherein the network-enabled device and the at least one other network-enabled devices are associated with a common user, wherein the agent of the network-enabled device communicates with the respective agents of the plurality of network-enabled devices using an Agent Communication Language, a peer-to-peer protocol, or any combination thereof.

14. The network-enabled device, as recited in claim 13, wherein the peer-to-peer protocol is Juxtapose (JXTA).

* * * * *